United States Patent [19]

Turner

[11] 4,113,047

[45] Sep. 12, 1978

[54] LEVER ASSEMBLIES FOR AUGMENTING PRIME MOVER POWER

[76] Inventor: Albert W. Turner, 1541 Hill Ave., Wheaton, Ill. 60187

[21] Appl. No.: 794,971

[22] Filed: May 9, 1977

[51] Int. Cl.² ............................................. B60L 11/18
[52] U.S. Cl. .................................... 180/65 D; 320/61
[58] Field of Search ................. 180/65 D, 65 B, 65 R; 320/61, 62; 318/139

[56] References Cited

U.S. PATENT DOCUMENTS

| 1,397,879 | 11/1921 | Pillmore | 180/65 D X |
| 1,439,483 | 12/1922 | Ritter | 180/65 R X |
| 1,557,520 | 10/1925 | Eckman et al. | 180/65 D X |
| 3,861,487 | 1/1975 | Gill | 180/65 D |
| 3,939,935 | 2/1976 | Gill | 180/65 D |
| 4,024,926 | 5/1977 | Butoi | 180/65 D |
| 4,032,829 | 6/1977 | Schenavar | 180/65 D X |

*Primary Examiner*—Joseph F. Peters, Jr.
*Assistant Examiner*—Milton L. Smith
*Attorney, Agent, or Firm*—Hill, Gross, Simpson, Van Santen, Steadman, Chiara & Simpson

[57] ABSTRACT

A lever system for augmenting power input or energy to a prime mover is arranged to be tilted by motion resulting from heretofore unused available source. Specifically, the lever system is adapted to be mounted on an electric motor propelled vehicle to be tilted by irregularities in the road bed traversed by the vehicle for driving an alternator to generate electrical power input for the motor.

3 Claims, 12 Drawing Figures

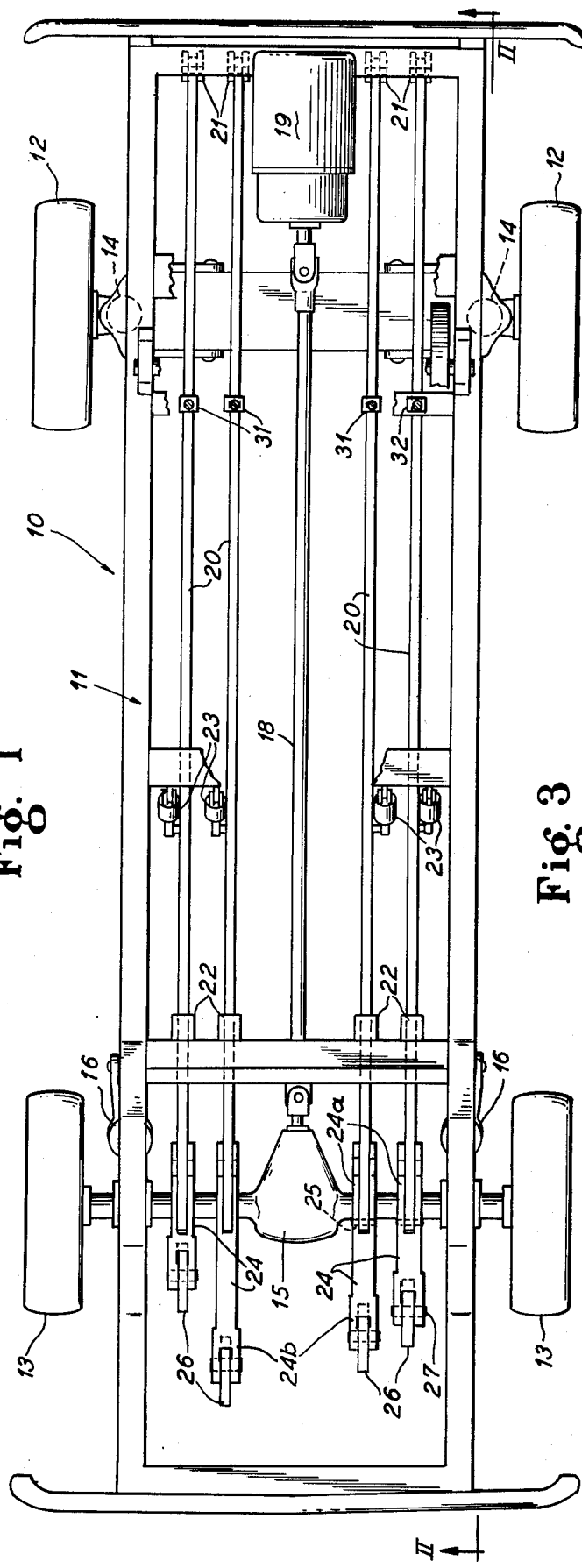
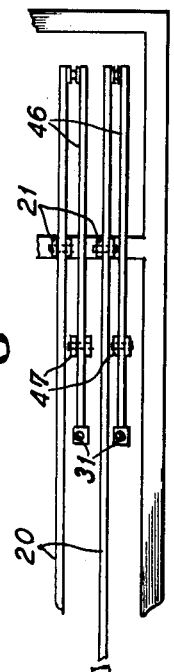
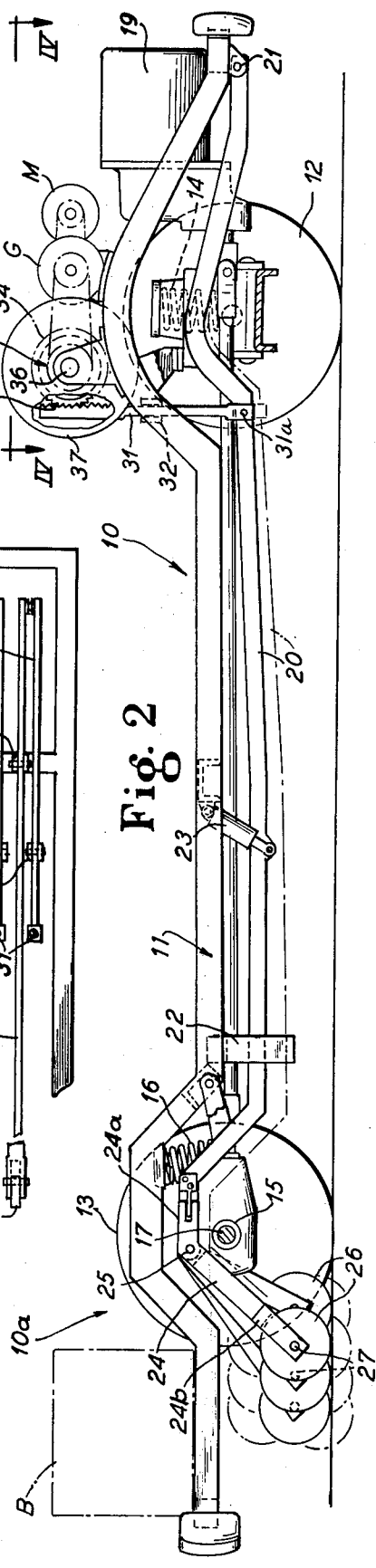

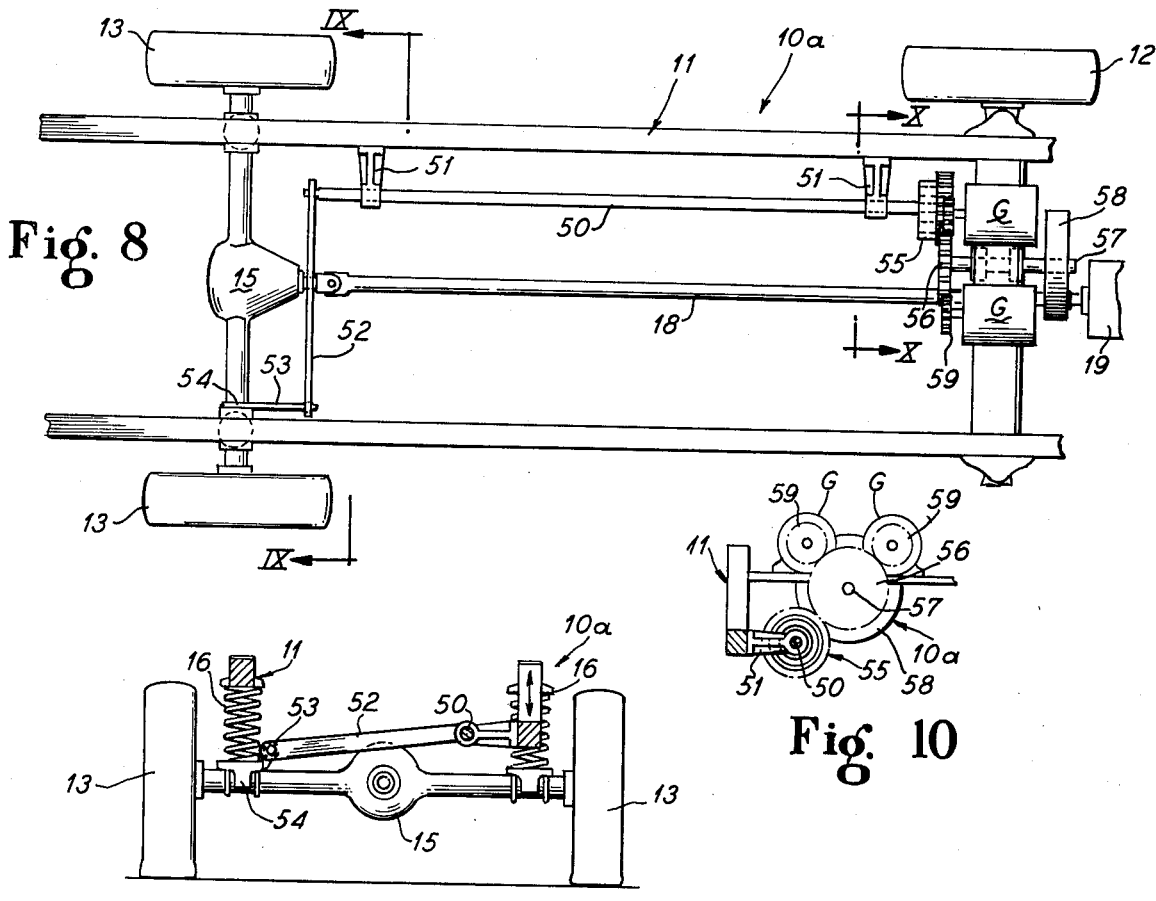
Fig. 8
Fig. 10
Fig. 9
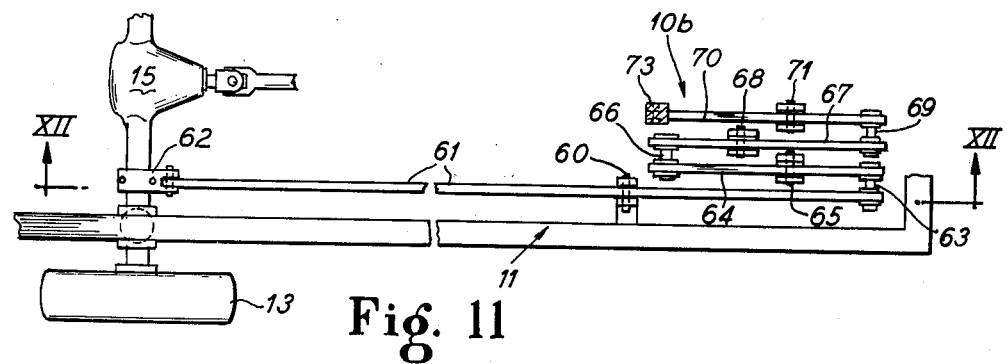
Fig. 11
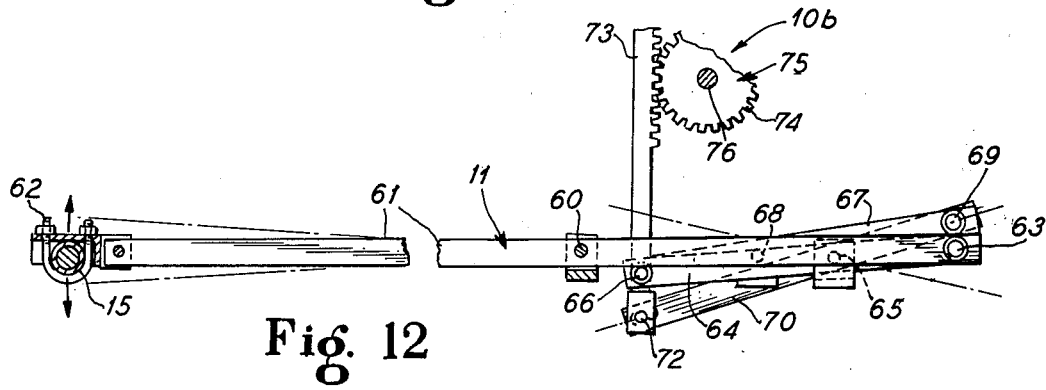
Fig. 12

LEVER ASSEMBLIES FOR AUGMENTING PRIME MOVER POWER

FIELD OF THE INVENTION

This invention deals with the utilization of otherwise unused or wasted energy for augmenting power input in a system driven by a prime mover. Specifically, the invention deals with a lever system for an electric motor driven vehicle having levers tilted by irregularities in the road bed traversed by the vehicle and delivering motion to an alternator for generating electricity to be supplied to the electric motor.

PRIOR ART

Conventional automotive vehicles are spring suspended to absorb road irregularity allowing the wheels to follow the road without imparting the road shocks to the vehicle body. The relative vertical movement between the wheels and the vehicle body is absorbed in the spring suspension system and any energy created by this movement is wasted.

SUMMARY OF THIS INVENTION

The present invention now utilizes irregularities in the road bed to deliver energy to the prime mover of a vehicle traveling on the road bed. For this purpose, a lever system is attached to the underside of a vehicle in such a manner that road irregularities swing or tilt the levers to deliver energy for use by the prime mover of the vehicle.

In one form of the invention, elongated levers extend longitudinally under the vehicle chassis, are pivoted to the front end of the chassis, and have rear ends equipped with wheels which ride on the road bed between the wheels of the vehicle. A plurality of such levers are arranged in side by side relationship and have different effective lengths so that the wheels will sequentially engage a depression or bulge extending across the portion of the road bed traversed by the vehicle. The lateral spacing of the wheels also accommodates tilting of a lever by a small chuck hole or bulge which would not be engaged by the other wheels. Spring loaded dampers press the levers downwardly from the bottom of the vehicle and prevent bouncing or vibration. Links are pivoted on the levers in spaced relation from their fulcrum point and are raised and lowered as the levers tilt to deliver rotary motion to an alternator for generating current to charge a battery system on the vehicle from which the vehicle prime mover is energized.

The levers can be connected in series to deliver increased movement to the links or to deliver increased forces to the links.

In another embodiment of the invention, a lever system is tilted by relative motion between the wheels and the body of the vehicle such as occurs when the wheels ride over irregularities in the road bed and the suspension system of the vehicle absorbs the road shocks. In this arrangement, a lever can be transversely mounted under the vehicle to rotate an alternator or can be longitudinally mounted under the vehicle to raise and lower an alternator driving link. The transverse or longitudinal lever can be connected to the rear axle of the vehicle and the longitudinal lever can be connected in series with other levers to increase movement of the link.

It is then an object of this invention to provide a lever system for augmenting power input to a prime mover with energy derived from an otherwise wasted source.

Another object of the invention is to provide a lever system for attachment to land vehicles which is actuated by irregularities in the road bed traversed by the vehicles and delivers energy to the vehicle prime mover.

A specific object of the invention is to provide an elongated lever system mounted under a land vehicle and actuated by road irregularities in the road bed traversed by the vehicle to drive an alternator for generating electricity to be used by the vehicle.

A further specific object of this invention is to use otherwise wasted motion between the wheels and chassis of a spring suspended vehicle for delivering energy to the vehicle.

A specific object of the invention is to provide a series of levers mounted under a vehicle chassis and actuated by road bed induced movement as the vehicle travels over the road for delivering motion to an alternator carried by the vehicle.

Other and further objects of this invention will be apparent to those skilled in this art from the following detailed description of the annexed sheets of drawings which, by way of preferred examples, illustrate several embodiments of the invention.

ON THE DRAWINGS

FIG. 1 is a top plan view of a land vehicle chassis equipped with a lever system of this invention;

FIG. 2 is a longitudinal sectional view taken along the line II—II of FIG. 1;

FIG. 3 is a fragmentary bottom plan view of a series arrangement of levers according to this invention;

FIG. 8 is a top plan view of an automotive vehicle equipped with an alternative lever system according to this invention;

FIG. 9 is a transverse sectional view taken along the line IX—IX of FIG. 8;

FIG. 10 is a transverse sectional view taken along the line X—X of FIG. 8;

FIG. 11 is a fragmentary view similar to FIG. 8 but showing a further modified lever system according to this invention;

FIG. 12 is a cross sectional view taken along the line XII—XII of FIG. 11.

AS SHOWN ON THE DRAWINGS

Figure 4:
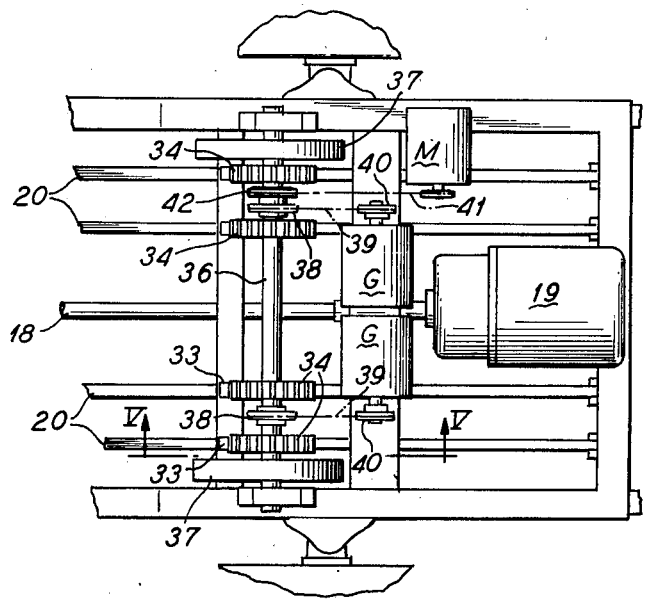
FIG. 4 is a fragmentary top plan view taken along the line IV—IV of FIG. 2.

The reference numeral 10 in FIGS. 1 and 2 designates generally a land vehicle such as an automobile having a chassis 11, front wheel 12,12 adapted to be steered, and rear wheels 13,13 adapted to be driven. Each front wheel 12,12 can be individually spring suspended on a spring such as 14,14. The rear wheels 13,13 are mounted on a transverse differential axle housing 15 suspended from the chassis 11 by springs 16 and driven by an axle 17 extending through the housing 15. The differential in the housing 15 is driven through a propeller shaft 18 from an electric motor 19 mounted on the front end of the chassis.

In accordance with this invention, a plurality of elongated levers 20 extend longitudinally under the chassis 11 in side by side relation and are fulcrumed at their front ends on pivots 21 carried by the front end of the chassis. A pair of levers are mounted on each side of the propeller shaft 18 but it will, of course, be understood that any number of levers could be used. The levers may be curved along their length to fit over wheel suspension and axle components of the vehicle. Straps 22 suspended from the chassis receive the levers 20 therethrough and limit the swinging movement thereof. Spring loaded dampers 23 also suspended from the chassis press the levers to the bottoms of the straps 22.

Struts 24 have bifurcated angled top ends 24a straddling the rear ends of the levers 20 and pinned to the rear ends by pivots 25. The angled bifurcated ends 24a overlie the differential 15 of the vehicle and the struts slope downwardly behind the axle housing to bifurcated rear ends 24b which receive road engaging wheels 26 and carry axles 27 on which the wheels freely rotate.

Figure 6:
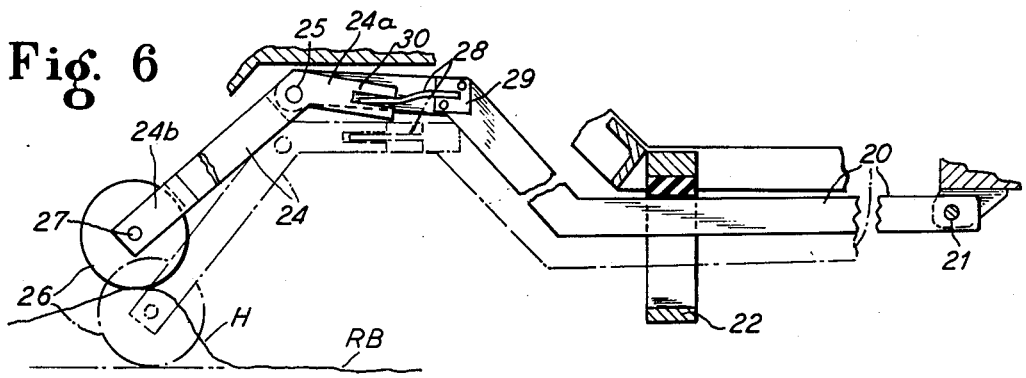
FIG. 6 is a fragmentary and broken cross sectional view illustrating a safety override feature for the levers.

As best shown in FIG. 6, leaf springs 28 are mounted on brackets 29 on the sides of the levers 20 and extend into slots 30 in the bifurcated ends 24a of the struts thereby holding the struts against pivoting relative to the levers 20 until the levers engage the top ends of the straps 22 whereupon the struts will pivot about the pins 25 and permit the wheels 26 to ride over high bumps such as H on the road bed RB. The springs thus act as yieldable fingers holding the struts 24 rigid with the links 20 until the road engaging wheels 26 are forced to raise to a level above the tops of the strokes of the levers 20. Until such high level is reached, however, the wheels 26 will rise and fall as they travel along the road bed and will raise and lower the levers 20 within the limits permitted by the straps 22.

As shown in FIG. 1, some of the struts 24 are longer than others so that the wheels 26 will be staggered across the road bed to be effective to tilt their respective levers 20 in succession as the wheels travel through a depression or over a hump.

Upstanding rack bars 31 are slidably mounted in guides 32 carried by the chassis 11 and have rack teeth 33 at their upper ends engaging the ring gear 34 of a sprag clutch 35 to rotate an output shaft 36 on the upstroke and to fall free on the downstroke. The bottoms of the upstanding rack bars 31 are pivoted to the levers 20 at 31a in spaced relation from the fulcrum pivots 21. Thus, as the levers 20 are raised by their wheels 26, the rack bars 31 will be raised to drive an output shaft 36 through the clutches 35.

Figure 5:
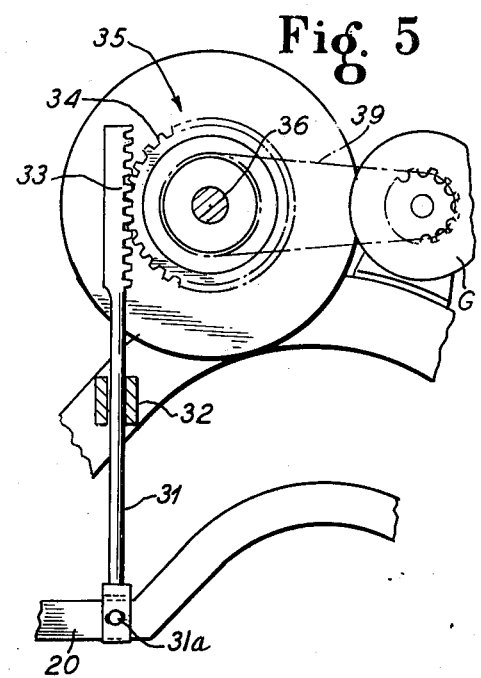
FIG. 5 is a transverse sectional view taken along the line V—V of FIG. 4.

A shown in FIGS. 2, 4 and 5, the output shaft 36, as shown in FIG. 4, has a fly wheel 37,37 on each end thereof and carries sprocket gears 38,38 driving chains 39,39 to sprockets 40,40 which drive alternators or generators G. Thus, as the levers 20 are raised by their wheels 26 as when passing over humps H of the road bed RB or as by riding out of depressions in the road bed, the rack bars 31 will be raised either simultaneously or in succession to "kick" the sprag clutches 35 for driving the output shaft 36. Successive "kicks" from the rack bars 31 through the sprag clutches to the output shaft will cause the shaft to spin and the fly wheels 37 will maintain rotation of the shaft between "kicks" from the rack bars 31. The rotating shaft then drives the alternators or generators G through the sprocket chain drives.

When the vehicle is at rest and it is desired to charge the batteries which energize the motor 19, the alternators or genertors G can also be driven from the shaft 36 by an electric motor M through a sprocket chain connection 41 with a clutch connection 42 to the shaft 36. The motor M is energized from an outside source of electric current and provides for a selected charging of batteries when the vehicle is idle through the circuit diagram illustrated in FIG. 7.

Figure 7:
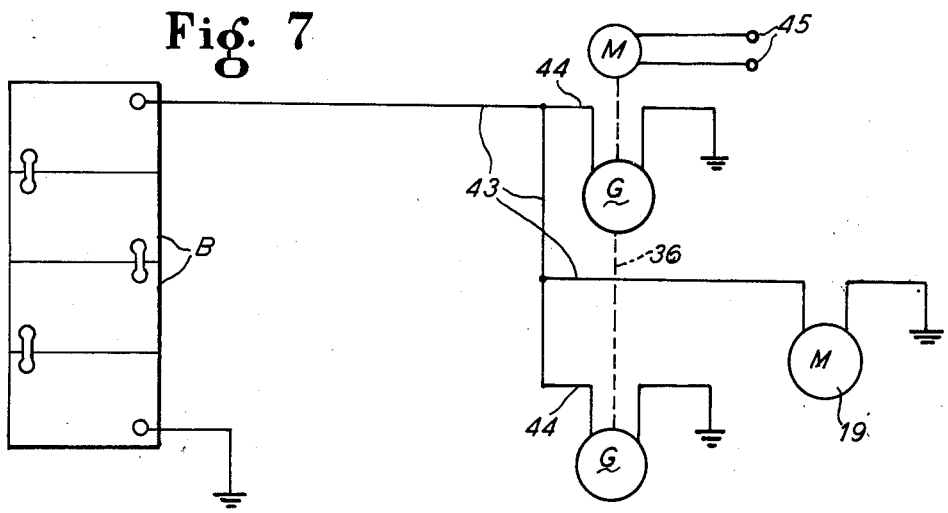
FIG. 7 is a circuit diagram showing the manner in which alternators or generators driven by the lever system of this invention are utilized to generate current to be used by the vehicle.

As shown in FIG. 7, a bank of storage batteries B delivers power to the vehicle motor 19 through wire connections 43 while current from the generators G,G is delivered to the wires 43 for charging the batteries B. The motor M receives current from an outside source such as a conventional household outlet 45 to drive the shaft 36 which in turn drives the generators G to also charge the batteries B when the vehicle is idle. This arrangement avoids the necessity for a battery charger and makes possible a plugging of the vehicle into conventional electrical power outlets for charging the batteries when the vehicle is parked.

If it is desired to increase the force delivered to the kick bars or rack bars 31, the levers 20, as shown in FIG. 3, can have their fulcrums 21 moved inwardly from their front ends so as to provide vertically swinging front end portions which are linked to the front ends of secondary levers 46 fulcrumed on pivots 47 spaced rearwardly from pivots 21 and providing short fulcrum arms to the kick bars 31. Thus, the levers are arranged in series and are fulcrumed at spaced pivots so that a short fulcrum arm on a wheel driven lever 20 drives a long fulcrum arm on an adjacent parallel lever 46 which in turn has a short fulcrum arm driving the kick bars 31. This arrangement decreases the stroke of the kick bars 31 but increases the force delivered to the kick bars. The pivot connections between the levers 20 and 46 can include pins riding in slots to accommodate the differences in the arcs of the swinging ends of the levers.

If desired, the output shaft 36 could be split into two shafts with the first portion being driven by the one pair of levers 20 on the one side of the propeller shaft 18 for driving the one generator G while the other shaft portion would be driven by the other pair of levers 20 on the opposite side of the propeller shaft 18 to drive the other generator.

As shown in FIG. 2, the bank of batteries B can be conveniently mounted on the rear end of the chassis 11.

In the modification 10a of FIGS. 8–10, parts common with parts identified in the embodiment 10 of FIGS. 1–7 have been marked with the same reference numerals.

As shown in FIG. 8, a shaft 50 is rotatably mounted under the chassis 11 in bearings 51 carried by the chassis to extend from adjacent the differential housing 15 to the front end of the vehicle. The rear end of this shaft 50 is keyed or otherwise locked to the end of a transverse lever 52 which has its opposite end secured to a rod 53 that extends forwardly from a bracket 54 anchored to the axle housing. Thus, the shaft 50 is oscillated as the wheel 13 on the side adjacent the rod 53 is raised and lowered relative to the wheel on the opposite side of the chassis. Thus, the one spring 16 adjacent the rod 53 will be flexed relative to the opposite suspension spring.

The forward end of the shaft 50 drives a sprag clutch 55 which in turn is geared to a central gear 56 on a shaft 57 carrying a fly wheel 58. This shaft 57 is also connected by gears 59 to drive generators G.

Therefore, in the modification 10a, the up and down movement of a vehicle wheel 13 will effect driving of a fly wheel shaft which in turn drives generators G for supplying electrical power to the vehicle motor 19.

In the modification 10b of FIGS. 11 and 12, the chassis 11 carries a pivot 60 forming the fulcrum for an elongated lever 61 extending parallel with a side frame of the chassis from the front to the rear axle of housing 15. The rear end of the lever is pinned to a bracket clamp 62 on the rear axle housing 15. The front end of the lever 61 is connected by a pin and slot connection 63 to a second lever 64 fulcrumed on the vehicle at 65 and having a pin and slot connection 66 with the rear end of a third lever 67 that is fulcrumed on the vehicle at 68 and has its opposite end connected by a pin and slot connection 69 to a fourth lever 70 fulcrumed on the vehicle at 71. The rear end of the fourth lever 70 is connected by a pin and slot connection 72 to an upstanding rack bar 73 having its rack teeth meshed with the gear 74 of a sprag clutch 75 having an output shaft 76. The series of levers 61, 64, 67, and 70 have their fulcrums 60, 65, 68, and 71 positioned relative to their pin and slot connections with each other to increase the stroke of the upstanding rack bar 73 so that tilting motion imparted to the first lever 61 as the rear axle 15 moves up and down relative to the chassis 11, is multiplied to provide an elongated stroke for the rack bar 73.

The output shaft 76, like the output shafts 36 and 57 of the embodiments 10 and 10a can have a fly wheel and will drive a generator to charge the battery B.

From the above descriptions, it will be clearly understood that this invention now makes use of otherwise unused or wasted movement to develop energy for a prime mover. It will be understood, of course, that the lever systems illustrated herein can be widely varied and arranged in series to increase driving strokes or to increase the force delivered through a shorter stroke.

I claim as my invention:

1. A lever system for augmenting power input to a prime mover including an automotive vehicle chassis driven by said prime mover which comprises longitudinally elongated levers pivotally mounted under the chassis, road engaging wheels mounted on the rear ends of said levers to tilt the levers as they ride over irregularities in the road bed traversed by said chassis, a fly wheel shaft on said chassis, links connecting said shaft with said levers to convert tilting motion of the levers into rotation of the shaft, and an electrical current generator driven by said fly wheel shaft.

2. The lever system of claim 1 wherein the road engaging wheels are transversely spaced across the width of the vehicle chassis.

3. The lever system of claim 2 wherein the transversely spaced wheels are also spaced longitudinally.

* * * * *